United States Patent [19]

Metsälä

[11] 4,263,257

[45] Apr. 21, 1981

[54] PIPETTE

[76] Inventor: Seppo J. Metsälä, Nauharinne 8, 01260 Vantaa 26, Finland

[21] Appl. No.: 70,766

[22] Filed: Aug. 30, 1979

[30] Foreign Application Priority Data

Sep. 8, 1978 [FI] Finland .................................. 782762

[51] Int. Cl.[3] .......................... B01L 3/02; G01N 1/14

[52] U.S. Cl. ................................ 422/100; 73/425.4 P; 73/425.6

[58] Field of Search ........ 422/100; 73/425.4, 425.4 P, 73/425.6; 222/309

[56] References Cited

U.S. PATENT DOCUMENTS

| | | | |
|---|---|---|---|
| 2,869,542 | 1/1959 | Orsten | 128/218 |
| 3,340,872 | 9/1967 | Cox | 128/218 |
| 3,591,056 | 7/1971 | Griffin | 73/425.6 |
| 3,646,817 | 3/1972 | Hinchman et al. | 422/100 |
| 3,810,391 | 5/1974 | Suovaniemi | 73/425.6 |
| 3,827,305 | 8/1974 | Gilson | 73/425.6 |
| 3,855,868 | 12/1974 | Suovaniemi | 73/425.6 |
| 4,144,761 | 3/1979 | Dzaack | 73/425.6 |

FOREIGN PATENT DOCUMENTS 2657672 6/1978 Fed. Rep. of Germany .......... 73/425.6

*Primary Examiner*—Michael S. Marcus
*Attorney, Agent, or Firm*—Biebel, French & Nauman

[57] ABSTRACT

A pipette having a frame part with a cylinder formed thereinside, a piston slidable in said cylinder and gasketed in relation thereto, a spring urging the piston towards its upper rest position, and separate filling and emptying press-buttons provided to press said piston downwards in connection with filling and emptying the pipette respectively, the filling and emptying press-buttons being provided with movement limiting members related thereto in such manner that the piston can be pressed to a lower level by emptying press-button than by the filling press-button. The press-buttons may be arranged in such way that in their rest position the emptying press-button is at a slightly higher level than the filling press-button and that both buttons can be pressed down to essentially the same level.

3 Claims, 3 Drawing Figures

PIPETTE

BACKGROUND OF THE INVENTION

1. Field of the Invention

The present invention relates to a pipette comprising a frame part with a cylinder formed inside the frame, a piston which moves within the cylinder and which has been gasketed in relation to the cylinder, a helical spring which keeps the piston at the upper position, and a filling press-button which affects the piston and by means of which the piston can be pressed down towards the tip of the pipette against the force of the helical spring to a depth determined by limiting members.

2. Description of the Prior Art

In a pipette of this type the limiting members determine the quantity of liquid taken into the pipette, and they can either be fixed at the manufacturing stage of the pipette or, alternatively, they are adjustable. In order to ensure that, when the button is pressed a second time, the pipette is definitely emptied entirely, it is known to provide it with two helical springs the rigidities of which differ from each other to such a degree that, when the button is pressed, a definite change is felt the more rigid spring begins to exert its effect. In this case, for filling the pipette, only the more flexible spring is compressed to a predetermined depth, where the more rigid spring begins to exert its effect, whereas, when the pipette is emptied, the button is pressed down all the way so that first the more flexible and then the more rigid spring are compressed.

This known arrangement has disadvantages, on the one hand in its imprecision, since the first "threshold" is not determined with absolute precision, and on the other hand in that it is difficult to use because, when the pipette is being emptied it is necessary to press the knob quite hard, which is strenuous for the user. Some kind of compromise must be made between these disadvantages, since if one is decreased the other one increases.

SUMMARY OF THE INVENTION

The present invention provides a pipette of the character once described, which comprises a frame part with a cylinder formed thereinside, a piston axially movable within the cylinder and gasketed in relation to the cylinder, a helical spring provided to keep the piston in an upper position unless forced downwards, a filling press-button which operates the piston and by means of which the piston can be pressed down towards the tip of the pipette against the force of the helical spring, the piston being returned by the spring when the press-button is released, a separate emptying press-button operating the same piston in a similar manner so as to urge down the piston against the force of the helical spring, and first and second limiting members provided to limit the downwards movement of the filling press-button and the emptying press-button respectively, said limiting members being so arranged, that the piston can be pressed to a greater depth with the emptying press-button than with the filling press-button.

It is an object of the present invention to eliminate the disadvantages of known pipette constructions and to provide a pipette which is unstrenuous to use, in which the stroke length of the piston at the filling stage is precisely determined, and in which the piston can, however, be pressed to a greater depth at the emptying stage in order to ensure emptying.

The essential idea of the invention is, therefore, that one and the same piston is provided with a separate emptying press-button by means of which the piston can be pressed to a somewhat greater depth than with the filling press-button. It can be mentioned in this context that, for example, U.S. Pat. No. 3,340,872 discloses a hypodermic syringe using capsules; it has two press-buttons one inside the other, with different stroke lengths. However, these press-buttons do not operate one and the same piston, but one button operates an axially moving small-diameter extension in the piston, and by means of this extension, before the contents of the syringe are discharged into the patient, a small sample can be drawn into the syringe of the patient's blood, provided that the syringe has been inserted into a vein or an artery, and specifically in order to check this. In this case, both the structure and the purpose of the piston and the press-buttons deviate from those of the present invention.

Furthermore, U.S. Pat. No. 2,869,542 discloses a syringe which also has two press-buttons arranged one inside the other. This syringe also uses capsules, and the ring-like piston on the upper side of the capsule is pressed down by means of one of the two buttons. The other press-button has been provided with hooks at its lower end to hold the piston of the capsule, and by pressing the two buttons in opposite directions the capsule can be released. The two press-buttons of this known arrangement have nothing in common with the filling and amptying press-buttons of the pipette according to the present invention.

DESCRIPTION OF THE PREFERRED EMBODIMENTS

Figure 1:
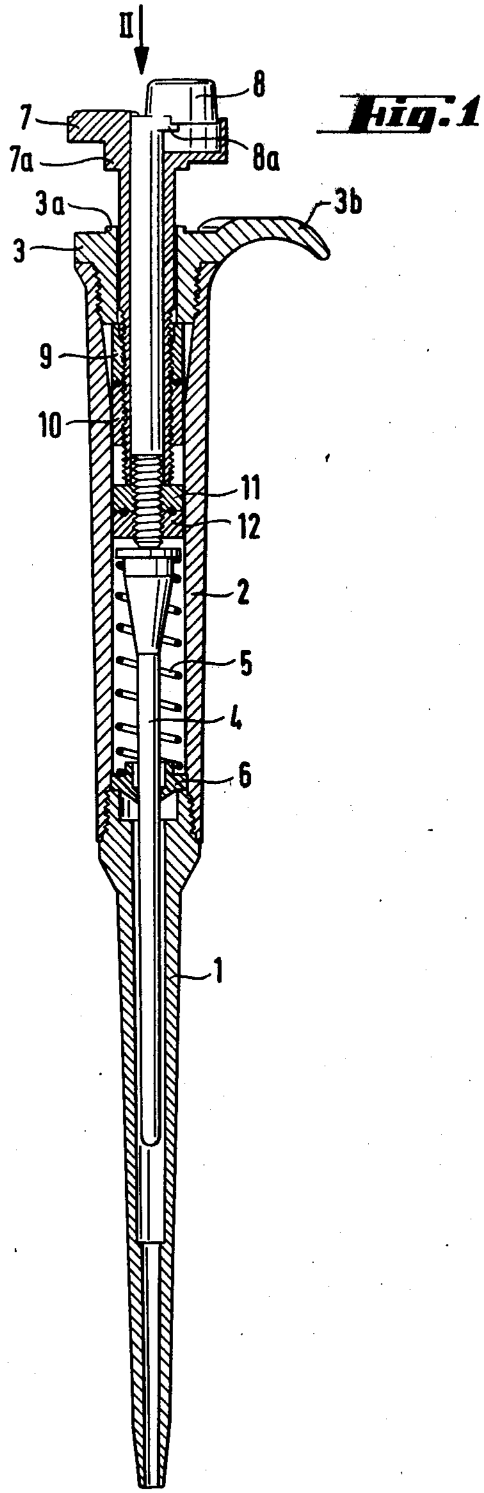
FIG. 1 depicts a side view, partly in section, of a pipette according to the invention.
Figure 2:
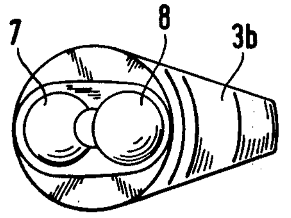
FIG. 2 depicts a plan view of the pipette.

The frame of the pipette illustrated in the figures consists of sleeve-like parts 1 and 2 attached to each other by threading and of a top part 3 attached to the upper part 2 by threading. A movable piston 4, pushed up by a helical spring 5, has been fitted in the cylindrical space inside the frame. The piston has been gasketed with a ring-like gasket 6 in relation to the cylinder and can be pressed downwards against the force of the helical spring by means of the buttons 7 and 8.

The shafts of the press-buttons 7 and 8 have been fitted one inside the other and to move axially in relation to each other. Threaded rings 9 and 10 have been fitted on the shaft of the button 7, threaded on the outside, and between these rings there can be a securing ring so that the rings can be locked at the desired position on the shaft of the button 7. Respectively, at the lower end of the shaft of the inner button 8 there are two rings 11 and 12 which lock in place by the transmission of a member between them. The ring 9 which reaches to the lower surface of the top 3 determines how high the button 7 can rise and, respectively, the ring 11 which reaches the lower surface of the shaft of the button 7 determines how much higher the button 8 can rise than the button 7. The extreme downward positions of the buttons are respectively determined by a shoulder 3*a* in the top together with a shoulder 7*a* in button 7 and a shoulder 8*a* in button 8. Thus, by adjusting the position of the rings 9, 10 and 11, 12 the piston stroke obtained by each button 7 and 8 can be regulated.

The essential idea of the invention lies in that one press-button 7 is used when filling the pipette and the other press-button 8, which produces a longer stroke, is used when emptying the pipette, in which case, during the emptying stage, the piston 4 is pushed to a greater depth towards the tip of the pipette than at the filling stage, and thus the pipette is definitely emptied.

It is evident that the pipette can have several filling press-buttons for producing batches of different size, as long as the emptying press-button is such that it will always produce the longest piston stroke. The preferred embodiment of the invention has, however, one press-button for filling and another for emptying, in which case the filling press-button can, of course, be adjusted continuously or in steps in a manner known per se. In this case the stroke of the emptying button is again longer than the filling-button stroke corresonding to the largest batch.

It is also evident that the shape and positioning of the press-buttons and their shafts can be varied widely within the idea of the invention.

In addition to the placement one inside the other, which has also been disclosed in the above U.S. Pat. No. 3,340,872, the shafts can, for example, have a rectangular cross section and can be arranged to slide against each other. They can also be hemispherical and place with the flat surfaces opposite each other. Of course the shafts can also be somewhat apart, separated by a partition.

The shape of the buttons themselves partly depends on the arrangement of the shafts, but ease of use is also a decisive factor in the design. In the embodiment depicted in the figure, the buttons have been shaped so that the emptying button 8 fits in the depression in the filling button 7 and that, when pressed down, the former forms an almost uninterrupted upper surface with the latter or remains approx. 1 mm above the filling button 7.

Regardless ease of use, it is advantageous to provide the frame of the pipette, in a manner known per se, with a protrusion 3*b*, against which the forefinger is placed when the button 7 or 8 is pressed with the thumb. The shafts of the button 7 is provided with, for example, four longitudinal protrusions (not shown), by means of which turning in relation to the top part 3 is prevented and which also enable the desired positioning in relation to the protrusion 3*b*.

It is evident that the invention can just as well be applied to, for example, series pipettes, which have several parallel tips and pistons operated by one press-button.

Figure 3:
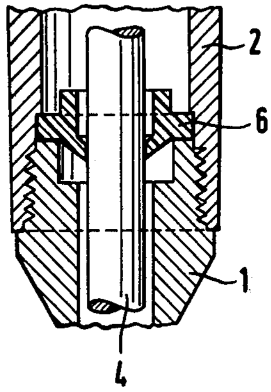
FIG. 3 depicts a detail of the pipette, partly in section.

It is known to use an O-ring for a gasket. If, however, it is desirable to construct the pipette so that it can be sterilized in its entirety, the gasket 6 can be made of, for example Teflon or some other suitable material and shaped as depicted in FIG. 3. It is, however, evident that the gasket in itself is not covered by the invention.

What is claimed is:

1. A pipette comprising:

a frame means defining a cylindrical space therein;

a piston axially movable within the said cylindrical space and cooperating with the said frame defining the cylindrical space in gasketed relationship;

a helical spring positioned within the said cylindrical space cooperating with the said piston and providing an upward force on the said piston for positioning the piston in spring biased relationship in an upper position in the said cylindrical space;

a filling press-button for overcoming the said upward force of the said helical spring and moving the said piston in a downward direction;

a hollow first shaft positioned in coaxially movable relationship with the said cylindrical space, having an upper end attached to the said filling press-button, and a threaded lower end;

an emptying press-button; for overcoming the said upward force of the said helical spring and moving the said piston in a downward direction;

a second shaft positioned in a slidable engagement within the said hollow first shaft, with the said second shaft having an upper end attached to the said emptying press-button, a threaded lower end, and with the axial end of the said second shaft positioned in contacting relationship with the said piston;

means including a first threaded ring member cooperating in adjustable threaded engagement with the said threaded lower end of the said first shaft and the said frame means providing an adjustable upward limit of movement of the said first shaft, thereby providing a predetermined fill magnitude of the said pipette;

means including a second threaded ring member cooperating in adjustable threaded engagement with the said threaded lower end of the said second shaft and the said lower end of the said first shaft providing an adjustable upward limit of movement of the said second shaft;

means for providing a fixed limit on the downward movement of the said fill press-button; and means for providing a fixed limit on the downward movement of the said emptying press-button whereby the downward movement of the said piston in cooperation with downward movement of the said emptying press-button is greater than the downward movement of the said piston in cooperation with the downward movement of the said fill press-button.

2. The pipette as claimed in claim 1 wherein the said emptying press-button when in the rest position extends higher than the said fill press-button, and the said means for providing a fixed limit on the downward movement of the emptying press-button positions the said emptying press-button in substantially flush relationship with the said fill press-button when the emptying press-button is depressed.

3. The pipette as claimed in claim 2 wherein the means for providing an adjustable upward limit of movement of the said first shaft includes means for locking the said threaded engagement of first threaded ring member on the said first shaft, and the said means for providing an adjustable upward limit of movement of the said second shaft including means for locking the said threaded engagement of the said second ring member on the said second shaft.

* * * * *

Notice of Adverse Decision in Interference

In Interference No. 101,022, involving Patent No. 4,263,257. S. J. Metsala, PIPETTE, final judgment adverse to the patentee was rendered Sept. 5, 1985, as to claims 1 and 2.

[*Official Gazette April 1, 1986.*]